US010306697B2

(12) United States Patent
Wang et al.

(10) Patent No.: US 10,306,697 B2
(45) Date of Patent: May 28, 2019

(54) APPARATUS AND METHOD FOR UTILIZING A RADIO ACCESS TECHNOLOGY TO CONNECT TO A TELECOMMUNICATION NETWORK

(71) Applicant: Futurewei Technologies, Inc., Plano, TX (US)

(72) Inventors: Julia Wang, San Diego, CA (US); Limei Wang, San Diego, CA (US); Haibo Zhong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/338,250

(22) Filed: Oct. 28, 2016

(65) Prior Publication Data

US 2018/0124852 A1 May 3, 2018

(51) Int. Cl.
*H04W 76/18* (2018.01)
*H04W 76/19* (2018.01)
(Continued)

(52) U.S. Cl.
CPC ........... *H04W 76/18* (2018.02); *H04W 4/023* (2013.01); *H04W 36/08* (2013.01); *H04W 36/32* (2013.01);
(Continued)

(58) Field of Classification Search
CPC ... H04W 76/027; H04W 88/06; H04W 36/08; H04W 48/18; H04W 76/028;
(Continued)

(56) References Cited

U.S. PATENT DOCUMENTS

| 9,485,697 B1* | 11/2016 | Wang | H04W 76/18 |
| 2009/0137265 A1* | 5/2009 | Flore | H04W 40/248 455/525 |

(Continued)

FOREIGN PATENT DOCUMENTS

| CN | 104081826 A | 10/2014 |
| CN | 105409290 A | 3/2016 |

OTHER PUBLICATIONS

U.S. Appl. No. 14/836,425, filed Aug. 26, 2015.

*Primary Examiner* — Quoc Thai N Vu
(74) *Attorney, Agent, or Firm* — Yeh Kurt Chang

(57) ABSTRACT

An apparatus, computer program, and method are provided for utilizing a particular radio access technology to connect to a telecommunication network before an expiration of a timer. A wireless communication device is provided including at least one hardware processor configured for sending a first request from the wireless communication device for connecting to a telecommunication network via a first base station for a first area. Such first base station implements a first radio access technology that has a first priority and a first data rate. In response to detecting a failure of the first request, a second radio access technology is utilized to connect to the telecommunication network before an expiration of a timer. Such second radio access technology has a second priority that is lower than the first priority and a second data rate that is lower than the first data rate. Further, in response to detecting that the wireless communication device has moved to a second area associated with a second base station before the expiration of the timer, a second request is sent via the second base station that implements the first radio access technology for utilizing the first radio access technology to connect to the telecommunication network before the expiration of the timer.

21 Claims, 11 Drawing Sheets

(51) Int. Cl.
*H04W 4/02* (2018.01)
*H04W 36/08* (2009.01)
*H04W 36/32* (2009.01)
*H04W 48/02* (2009.01)
*H04W 48/18* (2009.01)
*H04W 36/00* (2009.01)

(52) U.S. Cl.
CPC ........... *H04W 48/02* (2013.01); *H04W 48/18* (2013.01); *H04W 76/19* (2018.02); *H04W 36/0083* (2013.01)

(58) Field of Classification Search
CPC ..... H04W 36/00; H04W 48/20; H04W 88/02; H04W 76/02; H04W 76/18; H04W 76/19; H04W 36/32; H04W 4/02; H04W 4/023; H04W 48/02
See application file for complete search history.

(56) References Cited

U.S. PATENT DOCUMENTS

| | | | |
|---|---|---|---|
| 2009/0245176 A1* | 10/2009 | Balasubramanian | H04W 48/20 370/328 |
| 2011/0124334 A1* | 5/2011 | Brisebois | H04W 48/16 455/434 |
| 2012/0064884 A1* | 3/2012 | Ramachandran | H04W 36/0022 455/422.1 |
| 2014/0153485 A1* | 6/2014 | Tsuda | H04W 36/32 370/328 |
| 2015/0245266 A1 | 8/2015 | Lee et al. | |
| 2016/0037388 A1 | 2/2016 | Yang et al. | |
| 2016/0150496 A1 | 5/2016 | Kim et al. | |
| 2017/0245188 A1 | 8/2017 | Kim et al. | |

* cited by examiner

APPARATUS AND METHOD FOR UTILIZING A RADIO ACCESS TECHNOLOGY TO CONNECT TO A TELECOMMUNICATION NETWORK

FIELD OF THE INVENTION

The present invention relates to telecommunication networks, and more particularly to handling request failures on telecommunication networks.

BACKGROUND

Before or during service, a wireless device must issue various requests (e.g. attach/service/tracking update requests, etc.) to a network in order to receive or maintain service in the form of voice and/or data communication. Based on current network communication protocols such long term evolution (LTE), when such requests fail (e.g. an attempt counter reaches a maximum value, etc.), a request attempt random access channel (RACH) failure timer starts. Prior to expiration of such timer, the wireless device typically must utilize a less preferred radio access technology (RAT) (e.g. 3G/2G vs. LTE/LTE-A). Unfortunately, this, in turn, requires the wireless device to utilize an inferior RAT for an inordinate amount of time (e.g. 10 minutes or more, etc.) which may lead to a drop in customer satisfaction.

SUMMARY

An apparatus, computer program, and method are provided for utilizing a particular radio access technology to connect to a telecommunication network before an expiration of a timer. A wireless communication device is provided including at least one hardware processor configured for sending a first request from the wireless communication device for connecting to a telecommunication network via a first base station for a first area. Such first base station implements a first radio access technology that has a first priority and a first data rate. In response to detecting a failure of the first request, a second radio access technology is utilized to connect to the telecommunication network before an expiration of a timer. Such second radio access technology has a second priority that is lower than the first priority and a second data rate that is lower than the first data rate. Further, in response to detecting that the wireless communication device has moved to a second area associated with a second base station before the expiration of the timer, a second request is sent via the second base station that implements the first radio access technology for utilizing the first radio access technology to connect to the telecommunication network before the expiration of the timer.

In a first embodiment, the second request may be prevented from being sent from the wireless communication device via the first base station before the expiration of the timer. As an option, the second request may be prevented from being sent from the wireless communication device via the first base station before the expiration of the timer, by adding the first base station to an avoid list.

In a second embodiment (which may or may not be combined with the first embodiment), the failure of the first request may be detected, by determining whether a number of the first requests that have resulted in failure has reached a threshold.

In a third embodiment (which may or may not be combined with the first and/or second embodiments), movement of the wireless communication device to the second area associated with the second base station may be detected, by determining whether a cell node identity has changed a number of times.

In a fourth embodiment (which may or may not be combined with the first, second, and/or third embodiments), movement of the wireless communication device to the second area associated with the second base station may be detected, by determining whether at least one of: consecutive different cell node reselections or consecutive different cell node handovers has occurred a number of times.

In a fifth embodiment (which may or may not be combined with the first, second, third, and/or fourth embodiments), movement of the wireless communication device to the second area associated with the second base station may be detected, by determining whether the wireless communication device has moved a distance from the first base station. As options, it may be determined whether the wireless communication device has moved the distance from the first base station, utilizing a global positioning system (GPS) and/or one or more sensors of the wireless communication device.

In a sixth embodiment (which may or may not be combined with the first, second, third, fourth, and/or fifth embodiments), the first request and the second request may each include a non-access stratum (NAS) request.

In a seventh embodiment (which may or may not be combined with the first, second, third, fourth, fifth, and/or sixth embodiments), the second radio access technology may be utilized to connect to the telecommunication network until the expiration of the timer, if the movement of the wireless communication device to the second area associated with the second base station is not detected before the expiration of the timer.

In an eighth embodiment (which may or may not be combined with the first, second, third, fourth, fifth, sixth, and/or seventh embodiments), the first radio access technology may include an advanced permutation of the second radio access technology.

To this end, in some optional embodiments, one or more of the foregoing features of the aforementioned apparatus, computer program product and/or method may permit the wireless communication device to gain access to the first radio access technology before the expiration of the timer. This may, in turn, result in less time that the wireless communication device is required to utilizing the inferior second radio access technology, a feature that is otherwise foregone in systems that lack such capabilities. It should be noted that the aforementioned potential advantages are set forth for illustrative purposes only and should not be construed as limiting in any manner.

DETAILED DESCRIPTION

Figure 1:
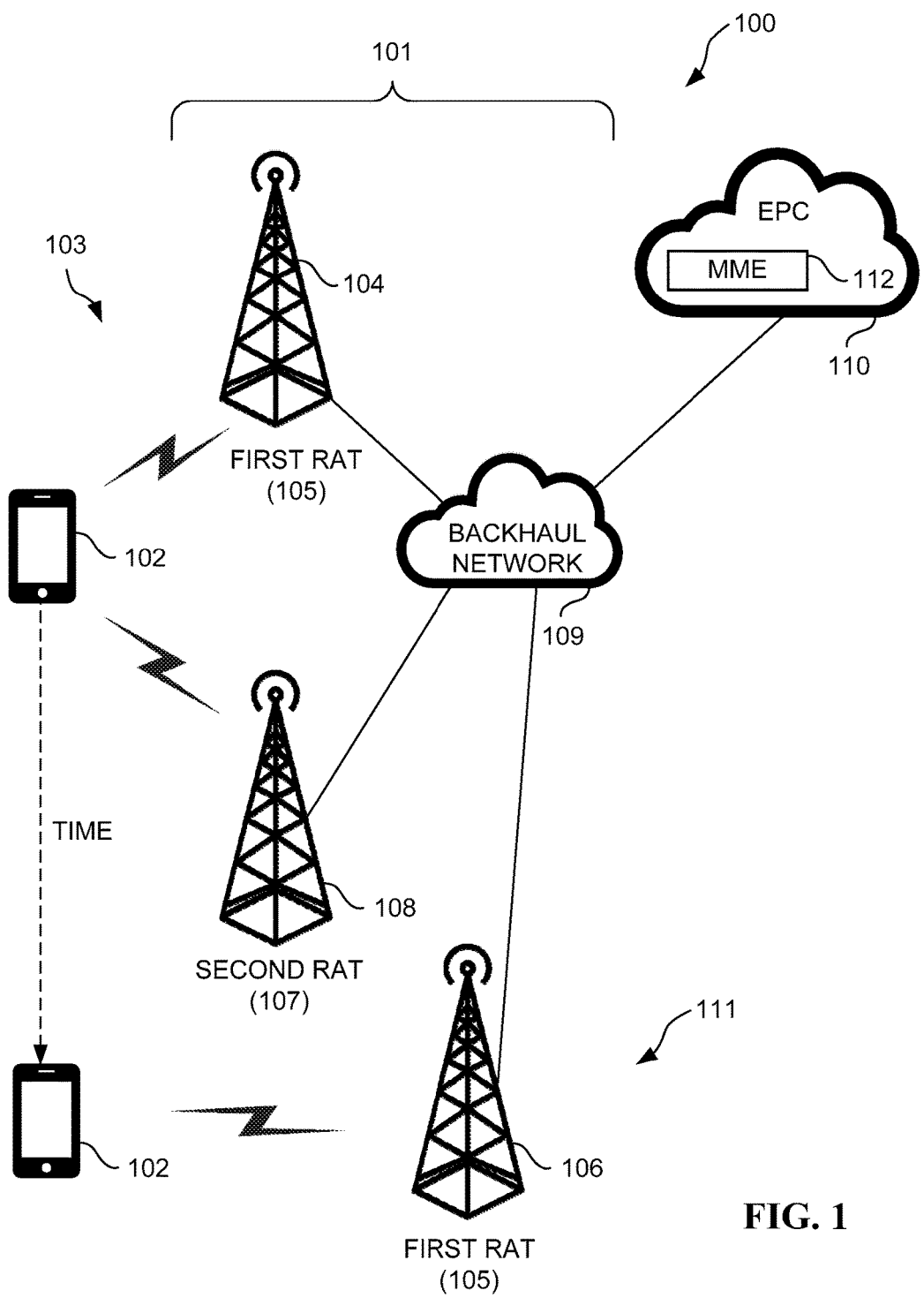
FIG. 1 illustrates a system for utilizing a particular radio access technology (RAT) to connect to a telecommunication network before an expiration of a timer, in accordance with one embodiment.

FIG. 1 illustrates a system 100 for utilizing a particular radio access technology (RAT) to connect to a telecommunication network 101 before an expiration of a timer, in accordance with one embodiment. In the context of the present description, a RAT (examples of which will be described later) refers to an underlying connection method or protocol by which a connection is made to the telecommunication network 101. As shown, the telecommunication network 101 includes a first base station 104 and a second base station 106 that implement a first RAT 105, and a third base station 108 that implements a second RAT 107.

Non-limiting examples of the foregoing base stations 104, 106, 108 may include a Node B, multi-standard radio (MSR) radio node such as an MSR BS, eNode B, network controller, radio network controller (RNC), base station controller (BSC), relay, donor node controlling relay, base transceiver station (BTS), access point (AP), transmission point, transmission nodes, remote radio unit (RRU), remote radio head (RRH), node in a distributed antenna system (DAS), a cell node, and/or any other apparatus that is configured for communicating with a wireless communication device 102 over the telecommunication network 101. Further, the wireless communication device 102 (or simply "wireless device") may, in various embodiments, include a phone, a tablet, a laptop, a vehicle, any desired type of user equipment (UE), and/or any other type of device capable of communicating on the aforementioned telecommunication network 101 or any other type of network, for that matter.

In various embodiments, the telecommunication network 101 may include any network where the wireless device 102 is capable of being served by the different base stations (e.g. base stations 104, 106, 108, etc.). Further, such telecommunication network 101 may include any combination of different RATs including the first RAT 105 and the second RAT 107. Still yet, the first RAT 105 has a first priority and a first data rate, while the second RAT 107 has a second priority that is lower than the first priority and a second data rate that is lower than the first data rate. In the context of the present description, the data rate may refer to a rate at which data (e.g. voice, media, etc.) is capable of being communicated.

Further, the aforementioned priorities may refer to a priority in which access and/or service is provided to the wireless device 102. For example, in one possible embodiment, such priority may be implemented utilizing a priority list that includes an order of priority for different RATs. Further, in different embodiments, the wireless device 102 may configure the priority list, or the priority list may be configured by and received from the telecommunication network 101.

In one possible embodiment, the first RAT 105 may include an advanced permutation of the second RAT 107. In other words, the first RAT 105 may incorporate one or more features of the second RAT 107, while including additional advanced features not included in the second RAT 107. For example, in one embodiment, the second RAT 107 may include a 3G or 4G network connection, while the first RAT 105 may include a long term evolution (LTE) or LTE-Advanced network connection. In another embodiment, the second RAT 107 may include a LTE network connection, while the first RAT 105 may include a LTE-Advanced network connection. In still another embodiment, the second RAT 107 may include a LTE-Advanced network connection, while the first RAT 105 may include an advanced permutation of the LTE-Advanced network connection. It should be noted, however, that use of other RAT networks (e.g. BLUETOOTH, WiFi, etc.) are contemplated, as well. Further, while not shown, the base stations 104, 106, 108 may also remain in communication with a network node [e.g. a mobility management entity (MME), a serving general packet radio service support node (SGSN), etc.].

In use in accordance with one possible embodiment, the first RAT 105 may be preferred over the second RAT 107 in view of the aforementioned superior priority/data rate. Further, in the event that the wireless device 102 requests service using the first RAT 105 via the first base station 104 while in a first area 103, such request (or serial requests) may fail. In such situation, the wireless device 102 may be required to utilize the second RAT 107 (via the third base station 108 or any other) until a timer expires.

In order to avoid such stringent requirement (and thus allow for increased use of the preferred first RAT 105), it may be detected whether the wireless device 102 has moved to a second area 111 associated with the second base station 106 before the expiration of the aforementioned timer. If this is the case, a request is sent via the second base station 106 that also implements the first RAT 105 so that the first RAT 105 may be utilized to connect to the network 101 before the expiration of the timer. More information will now be set forth regarding a method for implementing such feature, in accordance with one possible embodiment.

Figure 2:
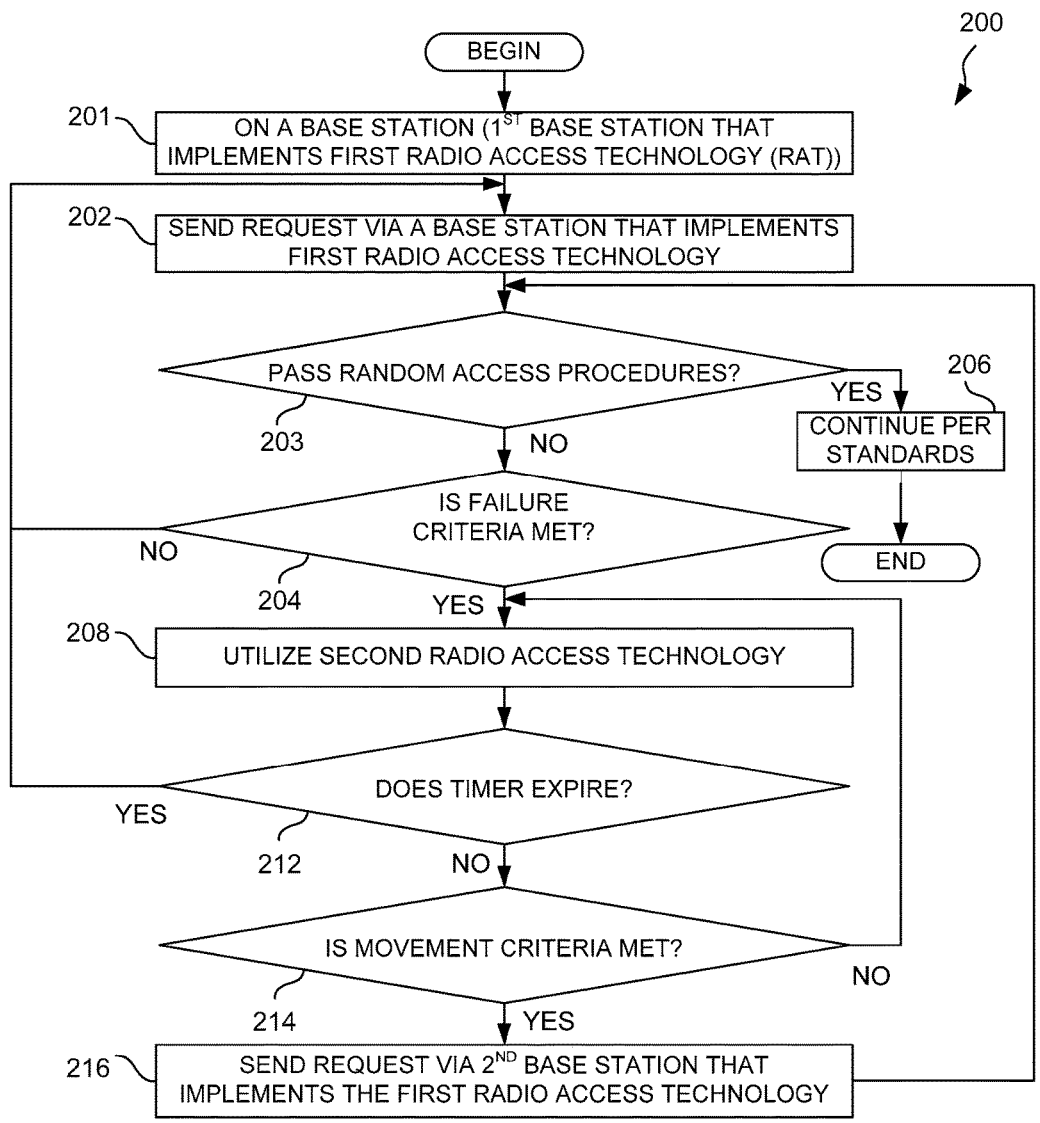
FIG. 2 illustrates a method for utilizing a particular RAT to connect to a telecommunication network before an expiration of a timer, in accordance with one embodiment.

FIG. 2 illustrates a method 200 for utilizing a particular RAT to connect to a telecommunication network before an expiration of a timer, in accordance with one embodiment. As an option, the method 200 may be implemented in the context of any one or more of the embodiments set forth in any previous and/or subsequent figure(s) and/or description thereof. For example, the method 200 may be carried out in the context of the system 100 of FIG. 1 and, in particular, the wireless device 102 thereof. However, it is to be appreciated that the method 200 may be implemented in the context of any desired environment.

As shown, a wireless device (e.g. the wireless device 102 of FIG. 1) resides, in operation 201, in a first area of a first base station (e.g. the first base station 104 of FIG. 1) for connecting to a network (e.g. the network 101 of FIG. 1). As mentioned earlier, such first base station implements a first RAT that has a first priority and a first data rate. Further, in operation 202, the wireless device sends a request for connecting to the network via a base station for an associated area. For example, during an initial iteration of the method 200 and, in particular, operation 202, the wireless device sends a first request for connecting to the network via the first base station for the first area. In the context of the present description, the aforementioned request may be any signal issued by the wireless device that is capable of requesting any attachment, service, update, or anything else in connection with the first base station.

For example, in one embodiment, the request may include a non-access stratum (NAS) request, where NAS refers to a functional layer in LTE wireless telecom protocol stacks between an evolved packet core (EPC) and UE, which is used to manage the establishment of communication sessions and maintain continuous communications with the UE during movement. As will become apparent during the description of different embodiments illustrated in subsequent figures, the request may take a variety of forms including, but not limited to an attachment request, a service request, a tracking area update (TAU) request, and/or any other request, for that matter. Still yet, the aforementioned request may, in one embodiment, be directed to a MME which tracks information in connection with the wireless device.

With continuing reference to FIG. 2, the method 200 continues by determining, in decision 203, whether the request of operation 202 passes random access procedures. In the present description, such procedures may include any process mandated by a communication protocol specification for determining whether the request should be fulfilled. To this end, if the request has been fulfilled per decision 203, the method 200 may continue in operation 206 in accordance with a standard protocol (e.g. LTE, LTE-Advanced, etc.).

On the other hand, if the random access procedures have not been passed per decision 203, it is determined in decision 204 whether failure criteria has been met in connection with the request of operation 202 and procedures of decision 203. In the context of the present description, such failure criteria may refer to any criteria that defines when a failure is to be determined to have occurred. In one embodiment, the failure criteria may refer to a certain number of times that the request of operation 202, while attempted, has nevertheless failed to achieve its intended result (e.g. by not being received by the first base station, etc.). Thus, in one exemplary embodiment, the failure of the request may be detected, by determining whether a number of the request attempts that have resulted in failure, has reached a threshold.

In response to detecting a failure of the request and, in particular, detecting a situation where the aforementioned failure criteria has indeed been met in decision 204, a second RAT (e.g. the second RAT 107) is utilized in operation 208 to connect to the network before an expiration of a timer per decision 212. As mentioned earlier, such second RAT has a second priority that is lower than the first priority and a second data rate that is lower than the first data rate. Further, it should be noted that the second RAT may be accessed via any desired base station that implements the same (e.g. the third base station 108 of FIG. 1 or even the other base stations shown in FIG. 1 if they implement multiple RATs, etc.).

In connection with (e.g. coincidently with/immediately before/after) operation 208, the aforementioned timer may be started by the wireless device and/or base station/network. In the context of the present description, such timer may include any time keeping device or mechanism that is capable of being used in connection with operations 208 and/or subsequent operations, in a manner that will soon be described. In one possible embodiment, the timer may include a request attempt random access channel (RACH) failure timer, or any other type of timer, of any duration.

As long as the aforementioned timer has not expired, it is determined in decision 214 whether movement criteria is met. In the context of the present description, the movement criteria may include any indicator (e.g. either exact or predictive, etc.) that the wireless device has moved away from the first area associated with the first base station, to a second area associated with a second base station (e.g. the second area 111 and second base station 106 of FIG. 1, etc.). As will become apparent during the description of different embodiments illustrated in subsequent figures, movement of the wireless device away from the first area associated with the first base station, to the second area associated with the second base station may be detected, by determining: whether a cell node identity has changed a number of times; whether at least one of: consecutive different cell node reselections or consecutive different cell node handovers has occurred a number of times; whether the wireless device has moved a distance from the first base station (e.g. utilizing a global positioning system (GPS) and/or one or more sensors of the wireless device, etc.); and/or whether any other movement criteria has been met. More information regarding such features will be set forth later.

As illustrated, the second RAT may be utilized to connect to the network until the expiration of the timer (per decision 212), if the movement of the wireless device to the second area associated with the second base station is not detected before the expiration of the timer. On the other hand, in response to detecting that the wireless device has moved to the second area associated with the second base station before the expiration of the timer, a second request is sent via the second base station that implements the first RAT for utilizing the first RAT to connect to the network before the expiration of the timer, as indicated in operation 216.

Such second request may (or may not) be of the same format, type, etc., as compared to the first request. Further, the use of the term "second" in connection with the aforementioned second request should not be construed as limiting in any manner. Specifically, such term should not necessarily imply an order between such request and any previous request (e.g. a first request, etc.), nor infer that only two requests exist. For example, the second request of operation 216 may be an initial request sent via the second base station, where such second request is repeated multiple times (e.g. more than twice). Similar considerations should also be made with respect to the term "first" in connection with the aforementioned first request. Further, it should be noted that, during subsequent iterations of the method 200 and, in particular, operations 202-214 (after operation 216 is performed), the aforementioned request/base station (in connection with the operations 202-214) may refer to the second request/second base station.

To this end, in some optional embodiments, one or more of the foregoing features may permit the wireless device to gain access to the first RAT before the expiration of the timer. This may, in turn, result in less time that the wireless device is required to utilizing the inferior second RAT, a feature that is otherwise foregone in systems that lack such capabilities. It should be noted that the aforementioned potential advantages are set forth for illustrative purposes only and should not be construed as limiting in any manner.

More illustrative information will now be set forth regarding various optional architectures and uses in which the foregoing method may or may not be implemented, per the desires of the user. For example, the second request may be prevented from being sent from the wireless device via the first base station before the expiration of the timer. As a further option, this may be accomplished by adding the first base station to an avoid list. It should be noted that the following information is set forth for illustrative purposes and should not be construed as limiting in any manner. Any of the following features may be optionally incorporated with or without the other features described.

Figure 3:
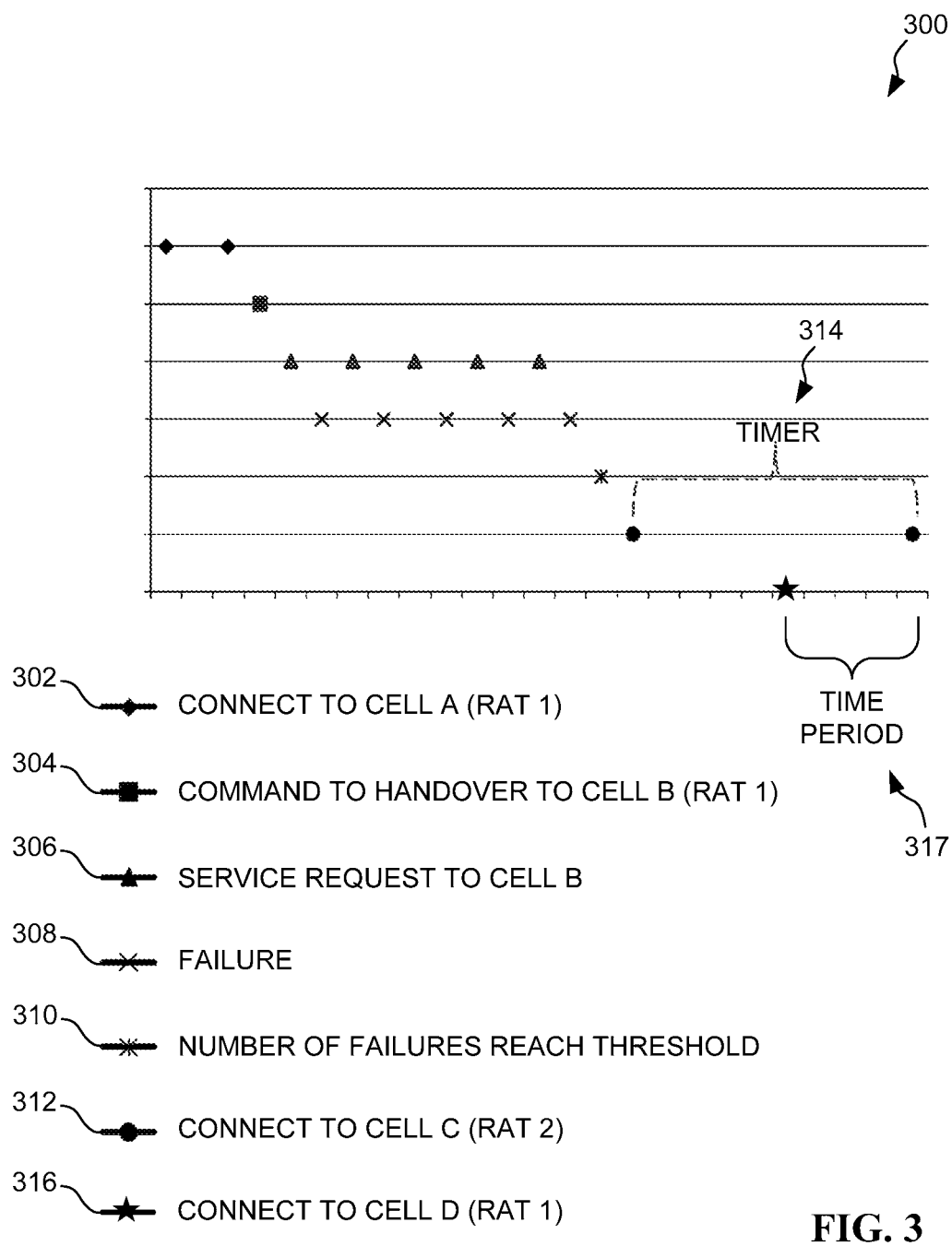
FIG. 3 illustrates a sample user case scenario for utilizing a particular RAT to connect to a network before an expiration of a timer, in accordance with another embodiment.

FIG. 3 illustrates a sample user case scenario 300 for utilizing a particular RAT to connect to a network before an expiration of a timer, in accordance with one embodiment. As an option, the sample user case scenario 300 may reflect an exemplary operation of any one or more of the embodiments set forth in any previous and/or subsequent figure(s) and/or description thereof.

As shown, a wireless device is first shown, in operations 302, to remain connected to a base station, or cell node, A that implements a first RAT (RAT1). Further, at operation 304, a command is received at the wireless device to handover to a cell node B that also implements the first RAT (RAT1). The wireless device then issues multiple service requests to cell node B as indicated by operations 306. As further shown, such multiple service requests to cell node B result in repeated failures in operations 308 until such number of failures reaches a predetermined threshold in operation 310.

As such time, in operation 312, the wireless device connects to a cell node C that implements a second RAT (RAT2) that has an inferior rate/priority associated therewith. As indicated, such connection remains in place for a duration of a timer 314 absent the detection of a movement of the wireless device to an area associated with a cell node D (or any other cell node except cell node B that was subject to the failure) that also implements the first RAT (RAT1). To the extent that the aforementioned movement is detected, a request is sent to cell node D, in operation 316, for utilizing the RAT1 to connect to the network, before the timer has expired. By this design, the wireless device minimizes use of the RAT2 before the timer has expired, by switching to the RAT1 during a time period 317 that represents some or all of the duration of the timer 314. More information will now be set forth regarding different embodiments that implement the foregoing functionality in the context of different types of requests.

Figure 4:
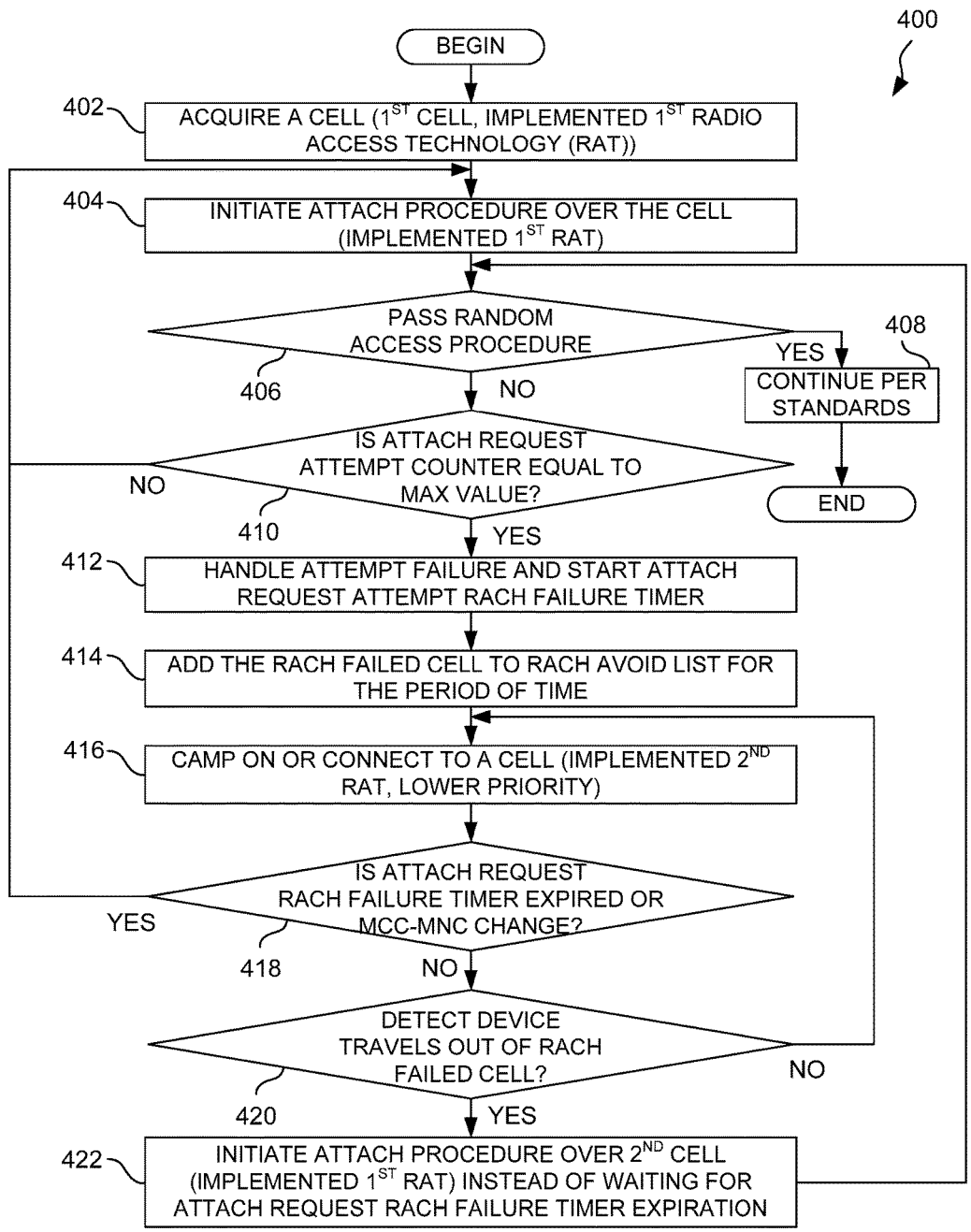
FIG. 4 illustrates a method for utilizing a preferred RAT to connect to a network in connection with an attach request, in accordance with another embodiment.

FIG. 4 illustrates a method 400 for utilizing a preferred RAT to connect to a network in connection with an attach request, in accordance with one embodiment. As an option, the method 400 may be implemented in the context of any one or more of the embodiments set forth in any previous and/or subsequent figure(s) and/or description thereof. However, it is to be appreciated that the method 400 may be implemented in the context of any desired environment.

As shown, information on a first base station, or cell node, (e.g. the first base station 104 of FIG. 1, etc.) that implements a first RAT (RAT1) is acquired by a wireless device (e.g. the device 102 of FIG. 1) in operation 402. By this design, an attachment procedure may be initiated in operation 404. In one embodiment, this may be accomplished by sending an attach request to the first cell node that implements the first RAT.

Next, in decision 406, it is determined whether a random access procedure has passed. In one possible embodiment, this may be accomplished by determining whether a response (e.g. for contention resolution, etc.) has been received from the cell node indicating that the attach request has been successfully received and is being carried out (again, per the appropriate protocol). If this is the case, the method 400 may continue in operation 408, in accordance with the appropriate standards protocol. For example, depending on the relative standards protocol, additional operations may be performed in connection with operation 408 including, but not limited to: authentication operations, channel quality reporting operations, power setting operations, beamforming operations, etc.

On the other hand, if it is determined, in decision 406, that the random access procedure has not passed (e.g. by failing to receive an acknowledgement/random access response, or failing to receive contention resolution, etc.), it is then determined in decision 410 whether an attach request counter value is equal to a maximum value (i.e. a threshold). If not, the method may revert to operation 404, as shown. In various embodiments, the aforementioned counter value may be incremented at each iteration of the operation 404, and the foregoing threshold may be predetermined or configurable (by the wireless device and/or cell node/network).

Once the attach request counter value is equal to a maximum value per decision 410, the failure may be handled in operation 412 by starting an attach request attempt RACH failure timer. Further, for reasons that will become apparent, the first cell node (that was the subject of the RACH failure) may be added to a RACH avoid list for a period of time which may be equal to a duration of the RACH failure timer. See operation 414. In use, such avoid list may be administered (e.g. stored, etc.) by the wireless device and/or cell node/network to ensure that the wireless device does not attempt to connect to the first cell node before expiration of the aforementioned timer. In one embodiment, the use of such avoid list in such manner may aid in avoid any "ping-ponging" (e.g. any repeated handover/reselection, etc.) in connection with the first cell node.

Next, in operation 416, the wireless device may connect to (or camp on) another cell node that implements a second RAT (RAT2) that has a lower priority/rate as compared to the RAT1. Throughout a duration of the RACH failure timer, it may be determined in decision 418 whether the RACH failure timer has expired, or a mobile country code (MCC) and/or mobile network code (MNC) has changed. If such decision 418 is decided in the positive, the wireless device may be permitted to re-attempt operation 404. It should be noted that MCC/MNC are queried in addition to the timer status in decision 418 since any such code change would indicate that there is no longer a need to follow failure protocol, since the wireless device has moved outside a significant area.

On the other hand, if the decision 418 is decided in the negative, it may be determined throughout the duration of the RACH failure timer (and use of the RAT2) whether the wireless device has traveled outside an area served by the first cell node and into an area served by another cell node (i.e. a second cell node) that also implements the RAT1. See decision 420. As mentioned earlier, the decision 420 may be carried out, in one embodiment, by determining whether a cell node identity has changed a number of times. Such cell node identity may refer to any identifier that identifies a particular cell node or area that the cell node serves [e.g. tracking area identifier, routing area identifier, system identifier (SID), network identifier (NID), etc.]. Thus, by determining that the cell node identity has changed a threshold number of times (e.g. 1, 2, 3 . . . N, etc.), it may be assumed that the wireless device has traveled a sufficient distance from the first cell node that was the subject of the failure, so as to trigger utilization of the preferred RAT1 via another cell node. In one embodiment, the aforementioned threshold number of times may be configurable.

In another embodiment, the decision 420 may be carried out by determining whether a reselection and a handover have occurred a number of times. In the context of the present description, a handover may refer to any operation that results in the wireless device being serviced by another cell node other than the cell node that is currently servicing the same, while the wireless device is in a connected mode state. Further, the aforementioned reselection may refer to any process by which the wireless device switches between one cell node and another cell node, while the wireless device is in an idle mode state (which includes any state in which data transfer is less than the connected mode state). Thus, by determining that the handover/reselection has occurred a threshold number of times (e.g. 1, 2, 3 . . . N, etc.), it may be assumed that the wireless device has traveled a sufficient distance from the first cell node that was the subject of the failure, so as to trigger utilization of the preferred RAT1. In one embodiment, the aforementioned handover/reselection may refer to consecutive different cell node reselections/handovers, such that consecutive reselections between same two cell nodes (and among same set of cell nodes) are not taken into account in decision 420, if the same cell node (or the same set of cell nodes) is reselected just after another reselection.

In still another embodiment, the decision 420 may be carried out by determining whether the wireless device has moved a physical distance from the first base station. This may be accomplished utilizing a global positioning system (GPS) of the wireless device and/or any other one or more sensors of the wireless device. Further, such physical distance amount may be set to be sufficient to allow for a safe assumption that the wireless device has traveled a sufficient distance from the first cell node that was the subject of the failure, so as to trigger utilization of the preferred RAT1. In one embodiment, the aforementioned distance may be configurable.

More information regarding the foregoing (and other) techniques for use in carrying out decision 420 may be found with reference to a co-pending application entitled "Systems and Methods for Improved Data Speeds for Wireless Devices" which was filed Aug. 26, 2015 under U.S. application Ser. No. 14/836,425, which is incorporated by reference in its entirety for all purposes. To the extent that the decision 420 is decided in the positive, an attach procedure may be initiated via a second cell node that implements RAT1, instead of waiting for the timer to expire. See operation 422. By this design, the wireless device may maximize utilization of the RAT1 network connection by not waiting until the expiration of the associated timer when movement occurs that allows for another RAT1 network connection. As mentioned earlier (and will not be repeated hereinafter during the description of subsequent embodiments), subsequent iterations of the method 400 and, in particular, operations 404-420, any attach procedure will be directed to the second cell node.

Figure 5:
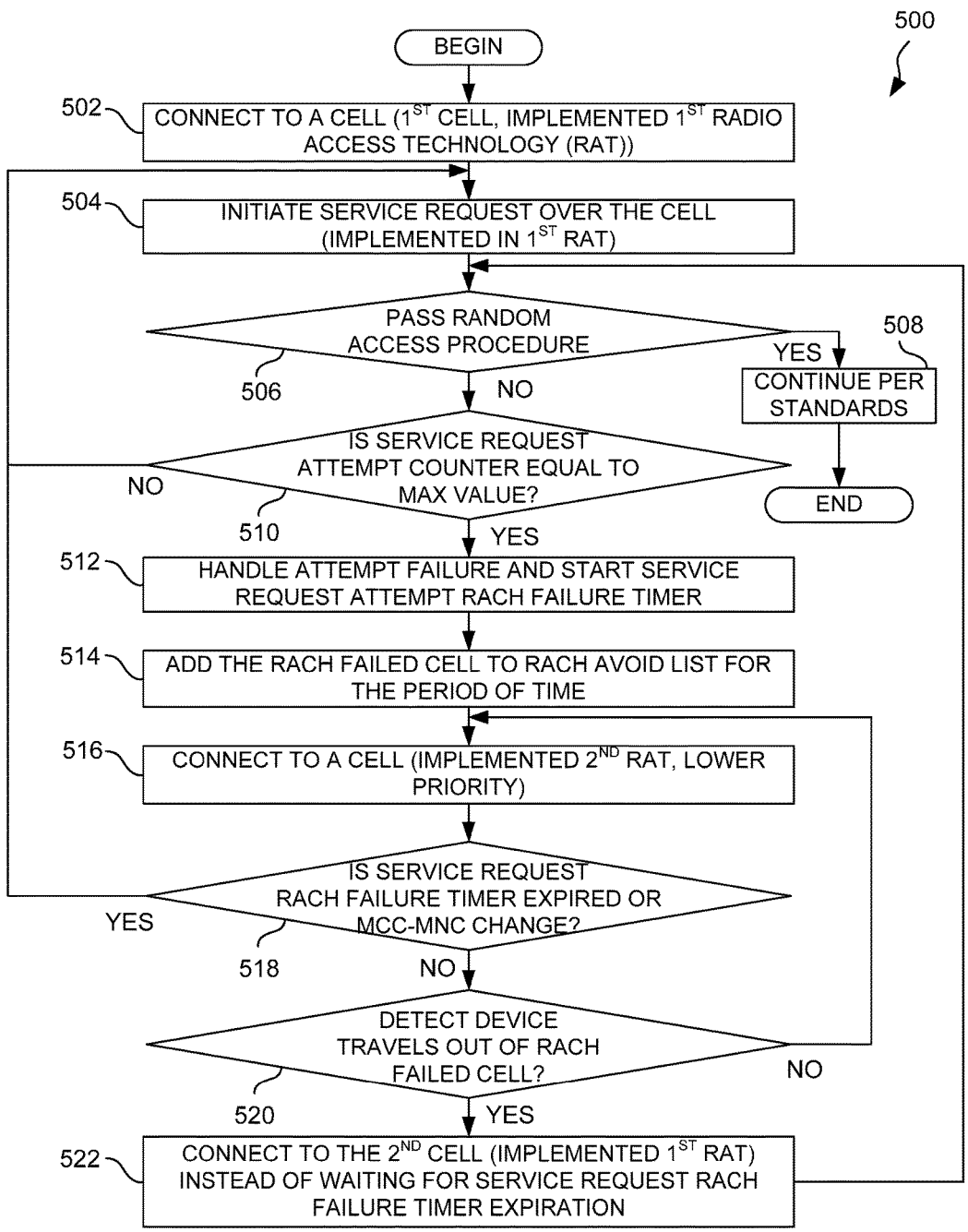
FIG. 5 illustrates a method for utilizing a preferred RAT to connect to a network in connection with a service request, in accordance with another embodiment.

FIG. 5 illustrates a method 500 for utilizing a preferred RAT to connect to a network in connection with a service request, in accordance with one embodiment. As an option, the method 500 may be implemented in the context of any one or more of the embodiments set forth in any previous and/or subsequent figure(s) and/or description thereof. However, it is to be appreciated that the method 500 may be implemented in the context of any desired environment.

As shown, information on a first base station, or cell node, (e.g. the first base station 104 of FIG. 1, etc.) that implements a first RAT (RAT1) is acquired by a wireless device (e.g. the device 102 of FIG. 1) in operation 502. By this design, an service request procedure may be initiated in operation 504. In one embodiment, this may be accomplished by sending a service request to the first cell node implements the first RAT.

Next, in decision 506, it is determined whether a random access procedure has passed. As mentioned earlier, in one possible embodiment, this may be accomplished by determining whether a response (e.g. for contention resolution, etc.) has been received from the cell node indicating that the service request has been successfully received and is being carried out (again, per the appropriate protocol). If this is the case, the method 500 may continue in operation 508, in accordance with the appropriate standards protocol.

On the other hand, if it is determined, in decision 506, that the random access procedure has not passed (e.g. by failing to receive an acknowledgement/random access response, or failing to receive contention resolution, etc.), it is then determined in decision 510 whether a service request counter value is equal to a maximum value (i.e. a threshold). If not, the method may revert to operation 504, as shown. In various embodiments, the aforementioned counter value may be incremented at each iteration of the operation 504, and the foregoing threshold may be predetermined or configurable (by the wireless device and/or cell node/network).

Once the service request counter value is equal to a maximum value per decision 510, the failure may be handled in operation 512 by starting a service request attempt RACH failure timer. Further, the first cell node (that was the subject of the RACH failure) may be added to a RACH avoid list for a period of time which may be equal to a duration of the RACH failure timer. See operation 514. In use, such avoid list may be administered (e.g. stored, etc.) by the wireless device and/or cell node/network to ensure that the wireless device does not attempt to connect to the first cell node before expiration of the aforementioned timer.

Next, in operation 516, the wireless device may connect to another cell node that implements a second RAT (RAT2) that has a lower priority/rate as compared to the RAT1. Throughout a duration of the RACH failure timer, it may be determined in decision 518 whether the RACH failure timer has expired, or a MCC/MNC has changed. If such decision 518 is decided in the positive, the wireless device may be permitted to re-attempt operation 504.

On the other hand, if the decision 518 is decided in the negative, it may be determined throughout the duration of the RACH failure timer (and use of the RAT2) whether the wireless device has traveled outside an area served by the first cell node and into an area served by another cell node (i.e. a second cell node) that also implements the RAT1. See decision 520. To the extent that the decision 520 is decided in the positive, a service request procedure may be initiated via a second cell node that implements RAT1 technology, instead of waiting for the timer to expire. See operation 522. On the other hand, if the decision 520 is decided in the negative, the device may continue staying on the cell node that implements the second RAT.

Figure 6:
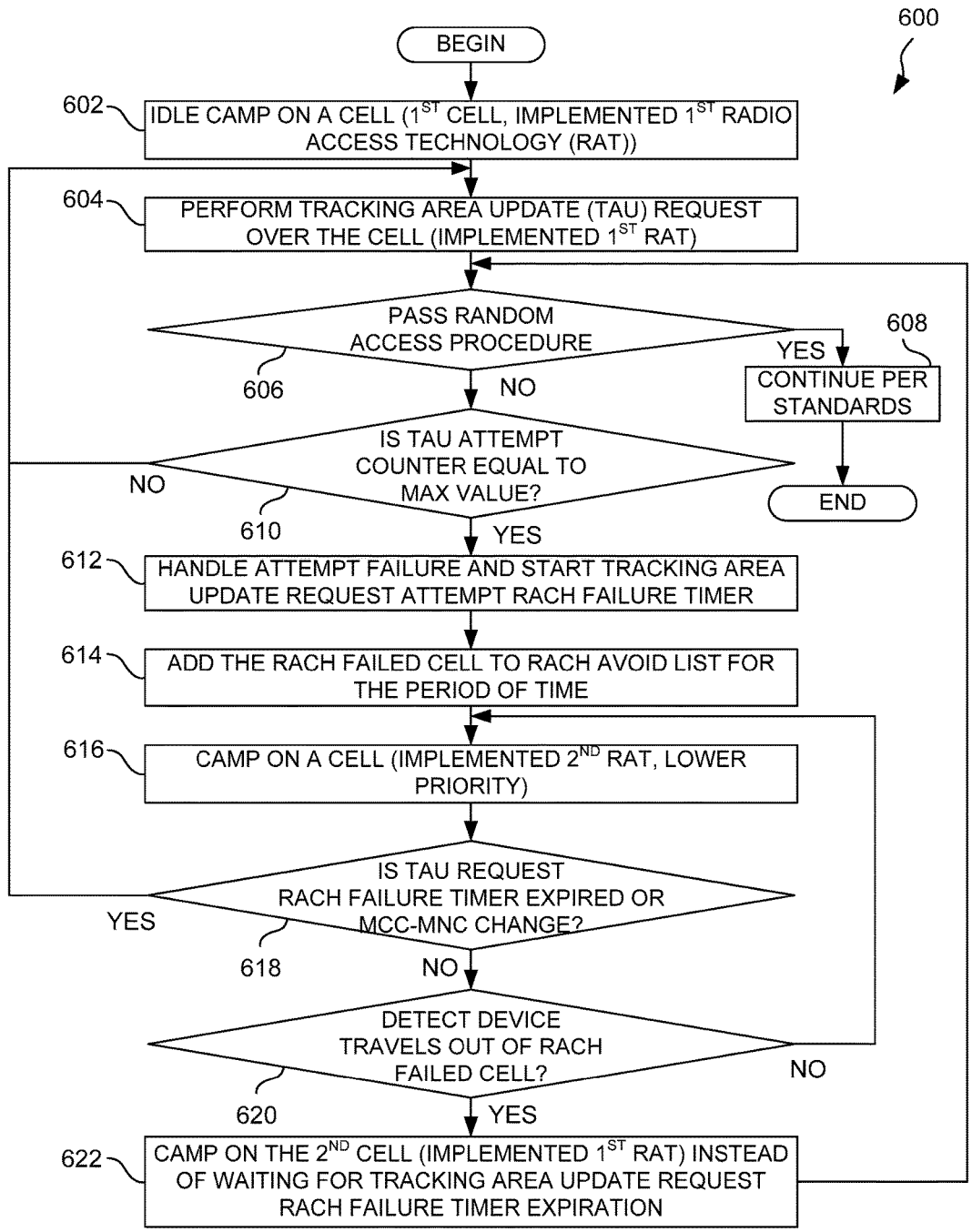
FIG. 6 illustrates a method for utilizing a preferred RAT to connect to a network in connection with a tracking area update request, in accordance with another embodiment.

FIG. 6 illustrates a method 600 for utilizing a preferred RAT to connect to a network in connection with a TAU request, in accordance with one embodiment. As an option, the method 600 may be implemented in the context of any one or more of the embodiments set forth in any previous and/or subsequent figure(s) and/or description thereof. However, it is to be appreciated that the method 600 may be implemented in the context of any desired environment.

As shown, information on a first base station, or cell node, (e.g. the first base station 104 of FIG. 1, etc.) that implements a first RAT (RAT1) is acquired by a wireless device (e.g. the device 102 of FIG. 1) in operation 602. By this design, a TAU procedure may be initiated in operation 604. In one embodiment, this may be accomplished by sending a TAU request to the first cell node that implements the first RAT.

Next, in decision 606, it is determined whether a random access procedure has passed. As mentioned earlier, in one possible embodiment, this may be accomplished by determining whether a response (e.g. for contention resolution, etc.) has been received from the cell node indicating that the TAU request has been successfully received and is being carried out (again, per the appropriate protocol). If this is the case, the method 600 may continue in operation 608, in accordance with the appropriate standards protocol.

On the other hand, if it is determined, in decision 606, that the random access procedure has not passed (e.g. by failing to receive an acknowledgement/random access response, or failing to receive contention resolution, etc.), it is then determined in decision 610 whether a TAU counter value is equal to a maximum value (i.e. a threshold). If not, the method may revert to operation 604, as shown. In various embodiments, the aforementioned counter value may be incremented at each iteration of the operation 604, and the foregoing threshold may be predetermined or configurable (by the wireless device and/or cell node/network).

Once the TAU request counter value is equal to a maximum value per decision 610, the failure may be handled in operation 612 by starting a TAU request attempt RACH failure timer. Further, the first cell node (that was the subject of the RACH failure) may be added to a RACH avoid list for a period of time which may be equal to a duration of the RACH failure timer. See operation 614. In use, such avoid list may be administered (e.g. stored, etc.) by the wireless device and/or cell node/network to ensure that the wireless device does not attempt to connect to the first cell node before expiration of the aforementioned timer.

Next, in operation 616, the wireless device may camp on another cell node that implements a second RAT (RAT2) that has a lower priority/rate as compared to the RAT1. Throughout a duration of the RACH failure timer, it may be determined in decision 618 whether the RACH failure timer has expired, or a MCC/MNC has changed. If such decision 618 is decided in the positive, the wireless device may be permitted to re-attempt operation 604.

On the other hand, if the decision 618 is decided in the negative, it may be determined throughout the duration of the RACH failure timer (and use of the RAT2) whether the wireless device has traveled outside an area served by the first cell node and into an area served by another cell node (i.e. a second cell node) that also implements the RAT1. See decision 620. To the extent that the decision 620 is decided in the positive, a TAU procedure may be initiated via a second cell node that implements RAT1 technology for camping on the second cell node, instead of waiting for the timer to expire. See operation 622. On the other hand, if the decision 620 is decided in the negative, the device may continue staying on the cell node that implements the second RAT.

Figure 7A:
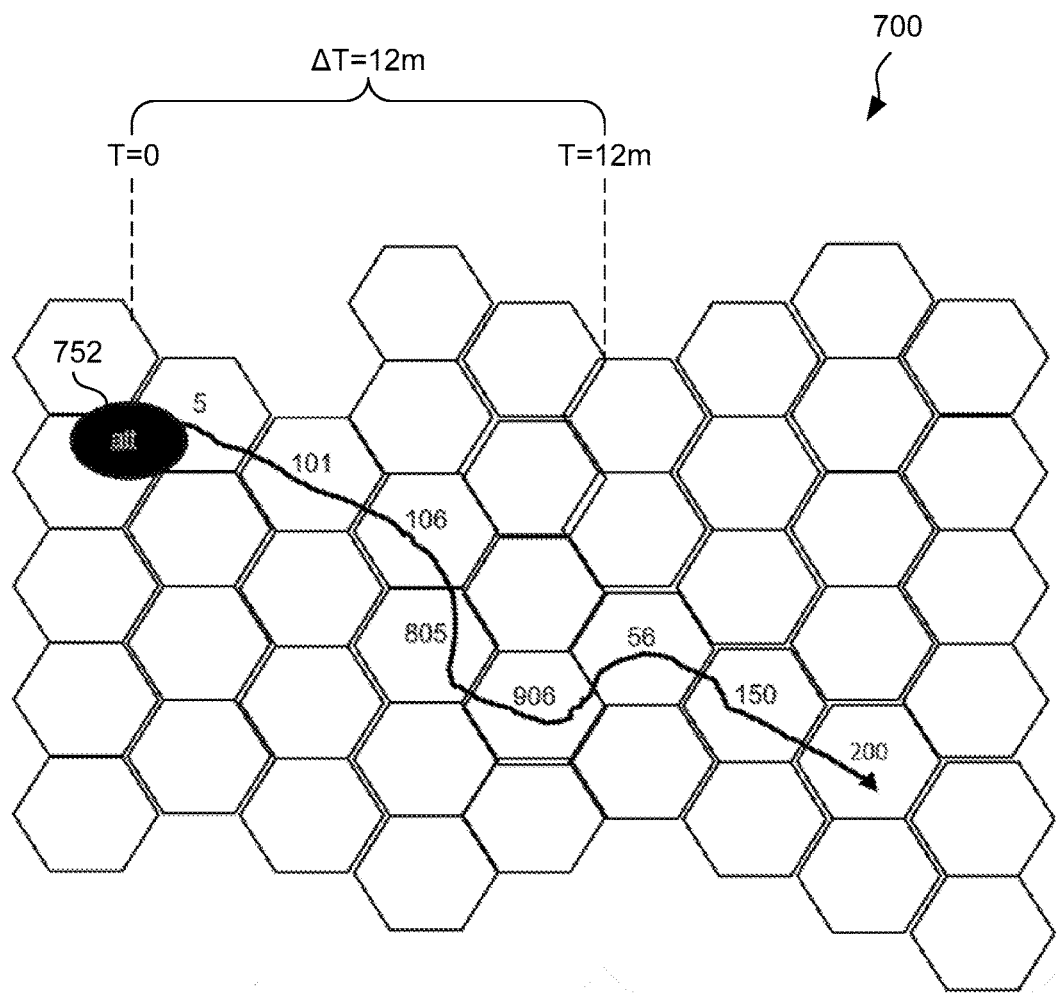
FIGS. 7A and 7B illustrate contrasted exemplary user case scenarios, in accordance with various embodiments.
Figure 7B:
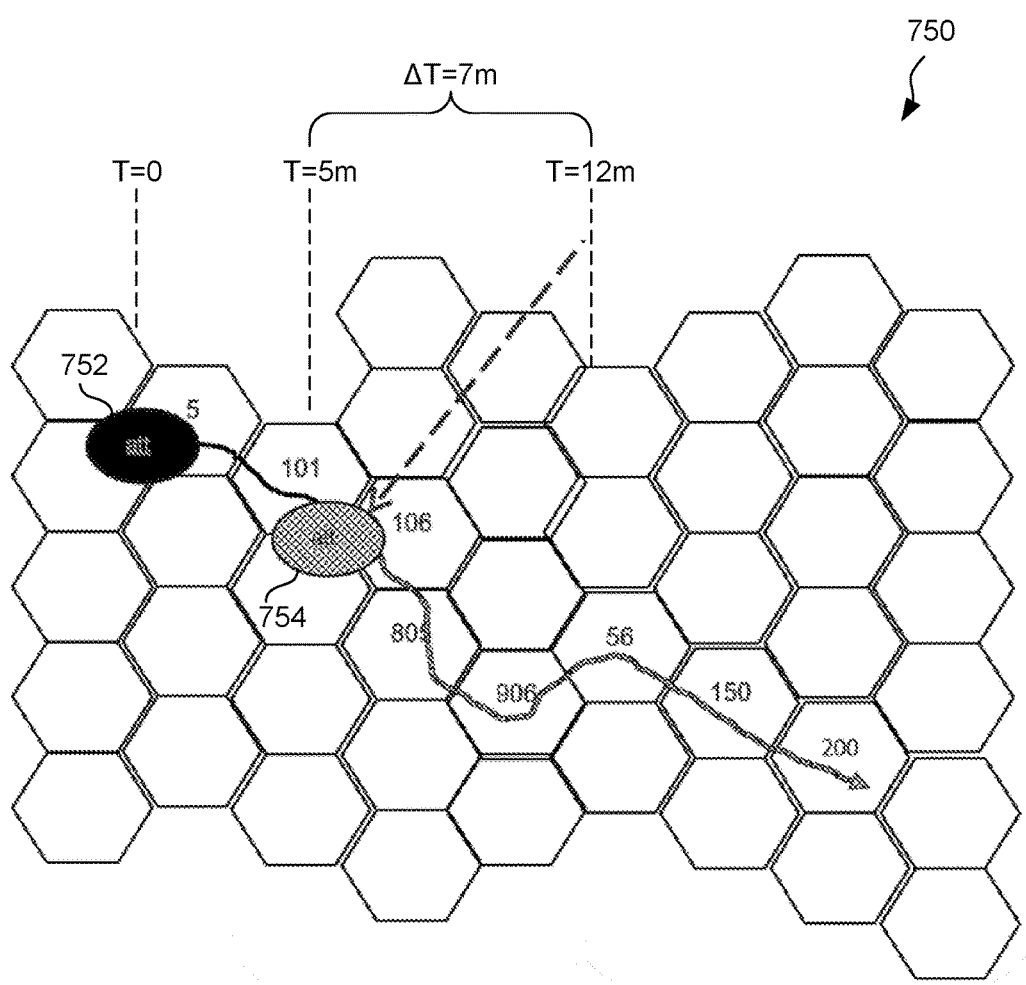

FIGS. 7A and 7B illustrate contrasted exemplary user case scenarios 700, 750 involving an attach request procedure, in accordance with various embodiments. As shown in FIG. 7A, a wireless device attach request fails at cell node 5 which implements a RAT1 (e.g. LTE/LTE-A), as a result of a RACH failure. Further, the device is not allowed to send an additional attach request for a RAT1 connection, and is forced to utilize an inferior RAT2 (e.g. 3G/2G) connection until an attach request RACH failure timer expires (e.g. after 12 minutes or any other duration), regardless as to whether the wireless device travels out of the cell node 5 area with weak coverage where the RACH failure occurred.

Similarly, as shown in FIG. 7B, the wireless device attach request fails at cell node 5 which implements a RAT1 (e.g. LTE/LTE-A), as a result of a RACH failure. In contrast, however, the wireless device detects that it travels out of the cell node 5 area with weak coverage where the RACH failure occurred, to an another cell node (e.g. cell node 106 that also implements RAT1). In response to the detection of such movement, the wireless device initiates an attach request through cell node 106 and registers on the RAT1-enabled network without having to wait for the RACH failure timer to expire. As shown, such technique may increase a time during which the wireless device utilizes the preferred RAT1 connection.

Thus, one or more of the various embodiments disclosed herein may be particularly useful when the wireless device travels out of a RACH failed/weak coverage RAT1-enabled cell node area, and enters into another, different RAT1-enabled cell node rather quickly, where such wireless device would otherwise be forced to remain on an inferior RAT2-connection because the timer has not expired. Without the above described technique of connecting to another RAT1-enabled cell node area sooner rather than later, a user may become frustrated if they become aware that they are being forbidden to gain access to a RAT1 for several minutes or longer. For example, if the user is engaged in online video streaming, the user will notice that their experience is slower with poorer quality on an inferior RAT2 network. This, in turn, may lead to customer complaints that may be avoided by using one or more of the various embodiments disclosed herein.

Figure 7C:
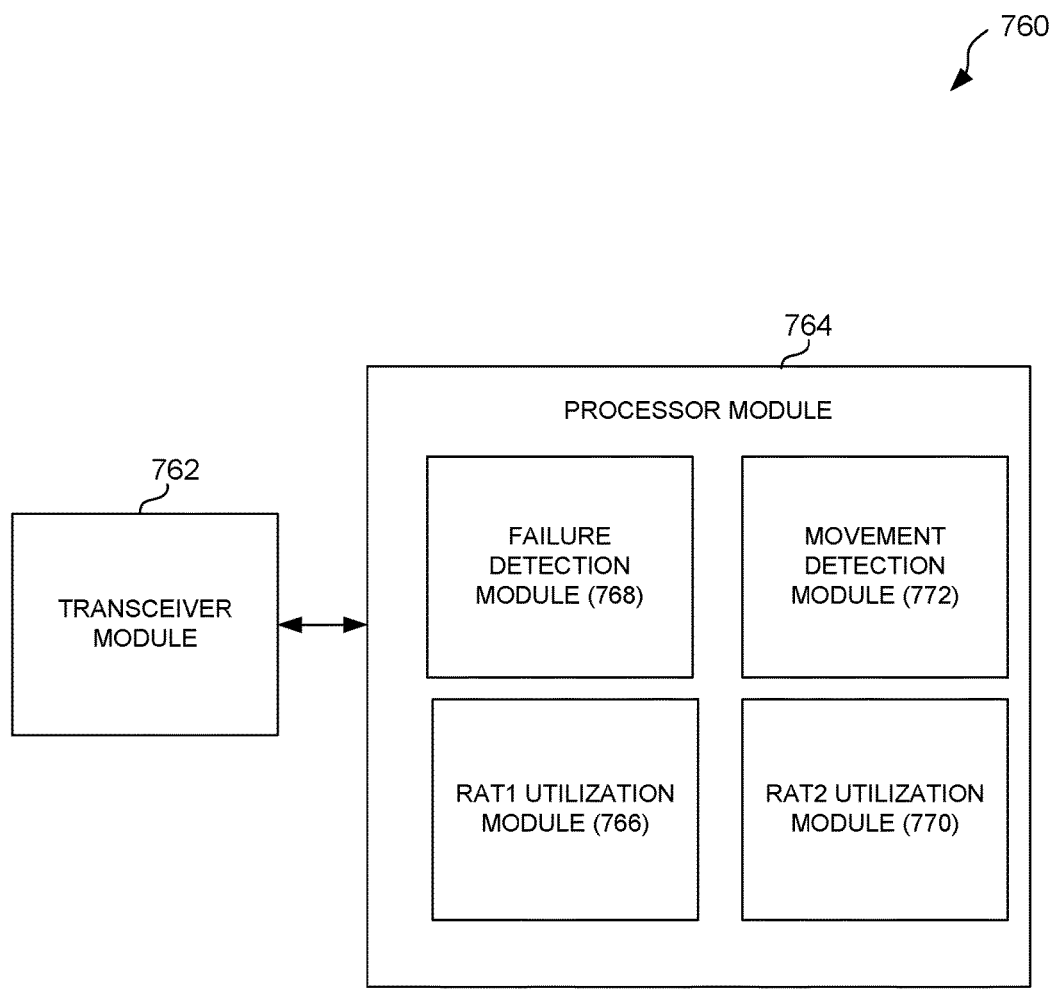
FIG. 7C illustrates a device for utilizing a particular RAT to connect to a telecommunication network before an expiration of a timer, in accordance with an embodiment.

FIG. 7C illustrates a device 760 for utilizing a particular RAT to connect to a telecommunication network before an expiration of a timer, in accordance with an embodiment. As an option, the device 760 may be implemented with one or more features of any one or more of the embodiments set forth in any previous and/or subsequent figure(s) and/or the description thereof. For example, the device 760 may include the wireless communication device 102 of FIG. 1. However, it is to be appreciated that the device 760 may be implemented in the context of any desired environment.

As shown, a transceiver means in the form of a transceiver module 762 is provided for sending requests in a manner that will soon become apparent. In various embodiments, the transceiver module 762 may include, but is not limited to a transceiver of the wireless communication device 102 of FIG. 1, and/or any other circuitry capable of the aforementioned functionality.

Also included is a processor means in the form of a processor module 764 in communication with the transceiver module 762. In various embodiments, the processor module 764 may include, but is not limited to a processor of the wireless communication device 102 of FIG. 1, a processor (to be described later) and any software controlling the same, and/or any other circuitry capable of the aforementioned functionality. Further, it should be noted that the processor module 764 may include and/or be supported by other circuitry (e.g. GPS, sensors, etc.) as necessary to permit the various operations disclosed herein.

For example, in one possible embodiment, the processor module 764 may include a RAT1 utilization module 766 for causing the transceiver module 762 to send a first request via a first base station that implements a first radio access technology (e.g. see operation 202 of FIG. 2, etc.). Further, the processor module 764 may include a failure detection module 768 for detecting a failure of the first request (e.g.

see decision 204 of FIG. 2, etc.). Still yet, the processor module 764 may include a RAT2 utilization module 770 for, in response to detecting the failure of the first request, switching to a utilization of a second radio access technology to connect to the telecommunication network (e.g. see operation 208 of FIG. 2, etc.). Even still, the processor module 764 may include a movement detection module 772 for detecting that the wireless communication device has moved to a second area associated with a second base station before the expiration of a timer (e.g. see decision 214 of FIG. 2, etc.). In such event, the RAT1 utilization module 766 may serve to cause the transceiver module 762 to send a second request via the second base station that implements the first radio access technology for utilizing the first radio access technology to connect to the telecommunication network before the expiration of the timer (e.g. see operation 216 of FIG. 2, etc.).

Figure 8:
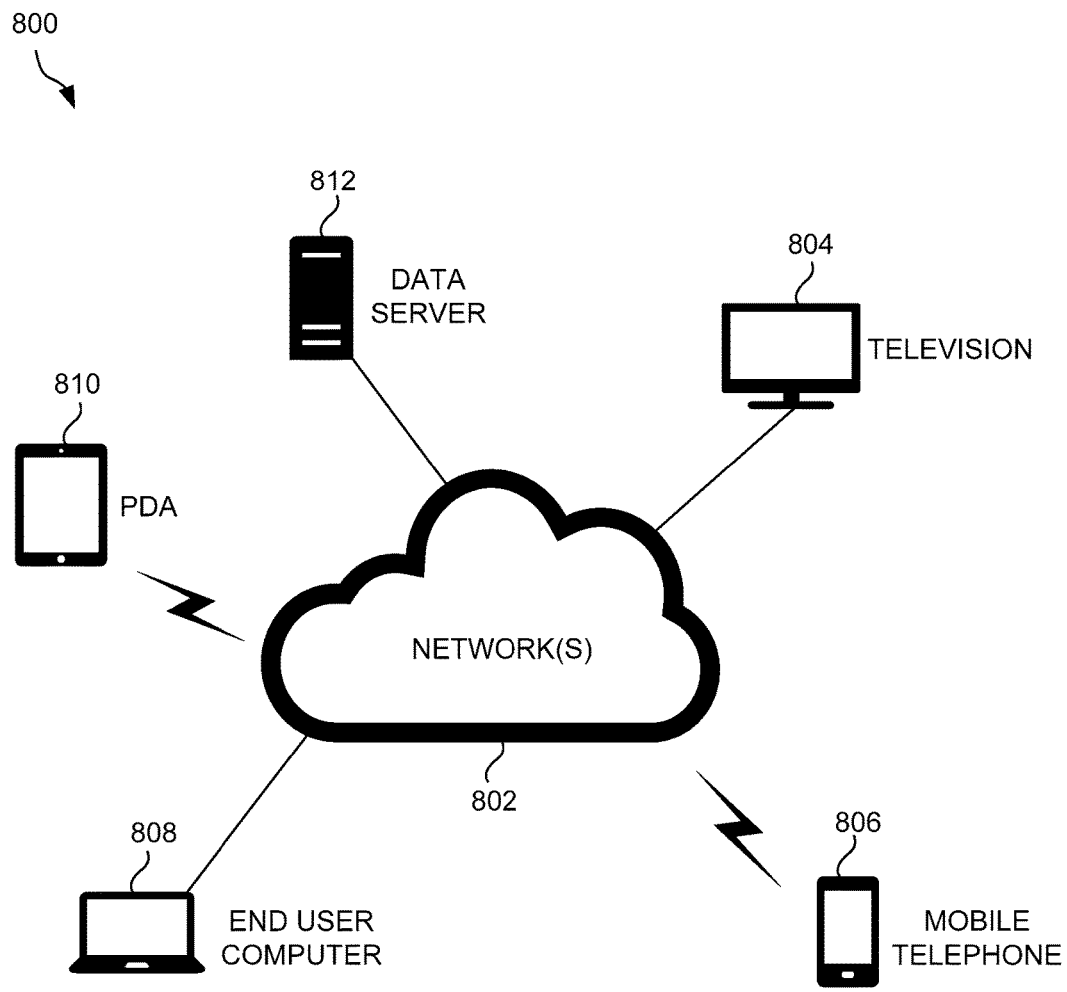
FIG. 8 is a diagram of a network architecture, in accordance with one embodiment.

FIG. 8 is a diagram of a network architecture 800, in accordance with one embodiment. As shown, at least one network 802 is provided. In various embodiments, any one or more components/features set forth during the description of any previous figure(s) may be implemented in connection with any one or more of the components of the at least one network 802.

In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 812 and a computer 808 may be coupled to the network 802 for communication purposes. Such computer 808 may include a desktop computer, lap-top computer, and/or any other type of logic. Still yet, various other devices may be coupled to the network 802 including a personal digital assistant (PDA) device 810, a mobile phone device 806, a television 804, etc.

Figure 9:
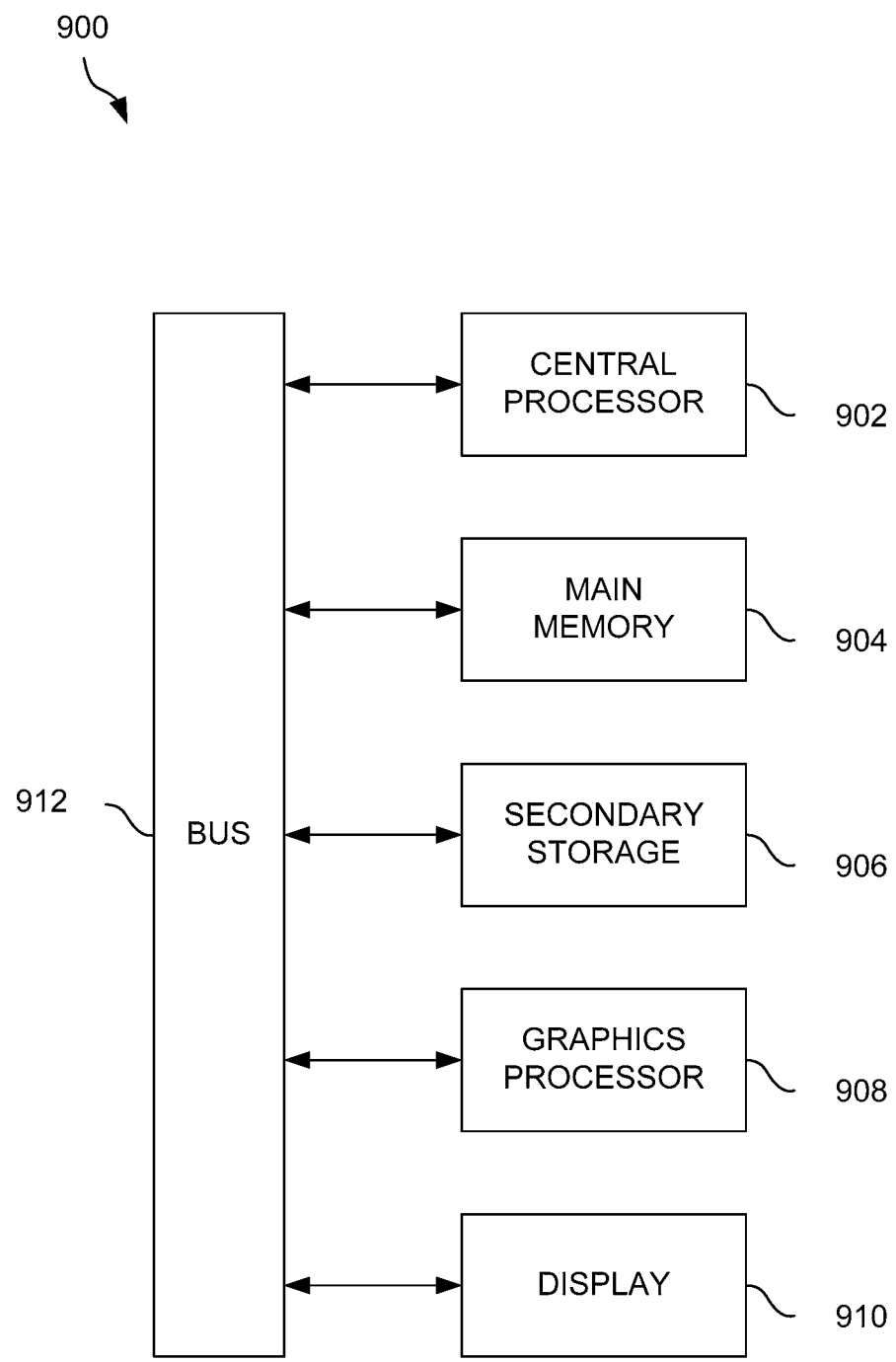
FIG. 9 is a diagram of an exemplary system, in accordance with one embodiment.

FIG. 9 is a diagram of an exemplary system 900, in accordance with one embodiment. As an option, the system 900 may be implemented in the context of any of the devices of the network architecture 800 of FIG. 8. However, it is to be appreciated that the system 900 may be implemented in any desired environment.

As shown, a system 900 is provided including at least one processor 902 which is connected to a bus 912. The system 900 also includes memory 904 [e.g., hard disk drive, solid state drive, random access memory (RAM), etc.]. The memory 904 may include one or more memory components, and may even include different types of memory. The system 900 also includes a display 910 in the form of a touchscreen, separate display, or the like. Further included is a graphics processor 908 coupled to the display 910.

The system 900 may also include a secondary storage 906. The secondary storage 906 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the memory 904, the secondary storage 906, and/or any other memory, for that matter. Such computer programs, when executed, enable the system 900 to perform various functions (as set forth above, for example). Memory 904, secondary storage 906 and/or any other storage comprise non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), or the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; or the like.

It should be understood that the arrangement of components illustrated in the Figures described are exemplary and that other arrangements are possible. It should also be understood that the various system components defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method, comprising:
   sending a first request from a wireless communication device for connecting to a telecommunication network via a first base station serving a first area, where the first base station implements a first radio access technology that has a first priority and a first data rate, and determining whether the first request passes a random access procedure, wherein that the wireless communication device does not receive a response from the telecommunication network results in random access procedure failure, which results in a failure of the first request;
   in response to detecting the failure of the first request:
   starting a timer having an expiration;
   preventing the wireless communication device from connecting to the telecommunication network via the first base station until the expiration of the timer occurs, and utilizing a second radio access technology to connect to the telecommunication network before the expiration of the timer occurs, where the second radio access technology has a second priority that is lower than the first priority and a second data rate that is lower than the first data rate; and
   while the wireless communication device is prevented from connecting to the telecommunication network via the first based station, and in response to detecting that the wireless communication device has moved to a second area served by a second base station, sending a second request via the second base station that implements the first radio access technology for utilizing the first radio access technology to connect to the telecommunication network.

2. The method of claim 1, wherein preventing the wireless communication device from connecting to the telecommunication network via the first base station includes preventing the second request from being sent from the wireless communication device via the first base station.

3. The method of claim 2, wherein the wireless communication device is prevented from connecting to the telecommunication network via the first base station by adding the first base station to an avoid list.

4. The method of claim 1, wherein the failure of the first request is detected, by determining whether a number of the first requests that have resulted in failure has reached a threshold.

5. The method of claim 1, wherein the movement of the wireless communication device to the second area associated with the second base station is detected, by determining whether a cell node identity has changed a number of times.

6. The method of claim 1, wherein the movement of the wireless communication device to the second area associated with the second base station is detected, by determining whether at least one of: consecutive different cell node reselections or consecutive different cell node handovers has occurred a number of times.

7. The method of claim 1, wherein the movement of the wireless communication device to the second area associated with the second base station is detected, by determining whether the wireless communication device has moved a distance from the first base station.

8. The method of claim 7, wherein it is determined whether the wireless communication device has moved the distance from the first base station, utilizing a global positioning system (GPS).

9. The method of claim 7, wherein it is determined whether the wireless communication device has moved the distance from the first base station, utilizing one or more sensors of the wireless communication device.

10. The method of claim 1, wherein the first request and the second request each includes a non-access stratum (NAS) request.

11. The method of claim 1, and further comprising: while the wireless communication device is prevented from connecting to the telecommunication network via the first based station, utilizing the second radio access technology to connect to the telecommunication network, when the movement of the wireless communication device to the second area associated with the second base station is not detected.

12. The method of claim 1, wherein the first radio access technology includes an advanced permutation of the second radio access technology.

13. An apparatus, comprising:
a wireless communication device including at least one hardware processor configured for:
sending a first request from the wireless communication device for connecting to a telecommunication network via a first base station serving a first area, where the first base station implements a first radio access technology that has a first priority and a first data rate and determining whether the first request passes a random access procedure, wherein that the wireless communication device does not receive a response from the telecommunication network results in random access procedure failure, which results in a failure of the first request;
in response to detecting the failure of the first request:
starting a timer having an expiration;
preventing the wireless communication device from connecting to the telecommunication network via the first base station until the expiration of the timer occurs, and
utilizing a second radio access technology to connect to the telecommunication network before the expiration of the timer occurs, where the second radio access technology has a second priority that is lower than the first priority and a second data rate that is lower than the first data rate; and
while the wireless communication device is prevented from connecting to the telecommunication network via the first based station, and in response to detecting that the wireless communication device has moved to a second area served by a second base station, sending a second request via the second base station that implements the first radio access technology for utilizing the first radio access technology to connect to the telecommunication network.

14. The apparatus of claim 13, wherein preventing the wireless communication device from connecting to the telecommunication network via the first base station includes preventing the second request from being sent from the wireless communication device via the first base station.

15. The apparatus of claim 14, wherein the wireless communication device is prevented from connecting to the telecommunication network via the first base station by adding the first base station to an avoid list.

16. The apparatus of claim 13, wherein the failure of the first request is detected, by determining whether a number of the first requests that have resulted in failure has reached a threshold.

17. The apparatus of claim 13, wherein the movement of the wireless communication device to the second area associated with the second base station is detected, by determining whether a cell node identity has changed a number of times.

18. The apparatus of claim 13, wherein the movement of the wireless communication device to the second area associated with the second base station is detected, by determining whether at least one of: consecutive different cell node reselections or consecutive different cell node handovers has occurred a number of times.

19. The apparatus of claim 13, wherein the movement of the wireless communication device to the second area associated with the second base station is detected, by determining whether the wireless communication device has moved a distance from the first base station.

20. The apparatus of claim 13, wherein the at least one hardware processor is further configured, while the wireless communication device is prevented from connecting to the telecommunication network via the first based station, for utilizing the second radio access technology to connect to the telecommunication network, when the movement of the wireless communication device to the second area associated with the second base station is not detected.

21. A computer program product comprising computer executable instructions stored on a non-transitory computer readable medium that, when executed by a processor, instruct the processor to:
send a first request from a wireless communication device for connecting to a telecommunication network via a first base station serving a first area, where the first base station implements a first radio access technology that has a first priority and a first data rate, and determine whether the first request passes a random access procedure, wherein that the wireless communication device does not receive a response from the telecommunication network results in random access procedure failure, which results in a failure of the first request;
in response to detecting a failure of the first request:
start a timer having an expiration;
prevent the wireless communication device from connecting to the telecommunication network via the first base station until the expiration of the timer occurs, and
utilize a second radio access technology to connect to the telecommunication network before the expiration of the timer occurs, where the second radio access technology has a second priority that is lower than the first priority and a second data rate that is lower than the first data rate; and
while the wireless communication device is prevented from connecting to the telecommunication network via the first based station, and in response to detecting that the wireless communication device has moved to a second area served by a second base station, send a second request via the second base station that implements the first radio access technology for utilizing the first radio access technology to connect to the telecommunication network.

* * * * *